United States Patent
Link et al.

(10) Patent No.: US 6,224,659 B1
(45) Date of Patent: May 1, 2001

(54) TIN COMPOUNDS AS ANTISKINNING AGENTS FOR OXIDATIVELY DRYING BINDERS

(75) Inventors: Günter Link, Goslar; Dirk Edelmann, Wuppertal, both of (DE)

(73) Assignee: Borchers GmbH, Monheim (DE)

( * ) Notice: Subject to any disclaimer, the term of this patent is extended or adjusted under 35 U.S.C. 154(b) by 0 days.

(21) Appl. No.: 09/346,215

(22) Filed: Jul. 1, 1999

(30) Foreign Application Priority Data

Jul. 9, 1998 (DE) .............................. 198 30 597

(51) Int. Cl.⁷ .......................... C09D 11/02; C09K 15/06; C09F 9/00
(52) U.S. Cl. .................... 106/31.13; 106/31.95; 106/287.19; 106/310
(58) Field of Search .................. 106/31.13, 287.19, 106/310, 31.95

(56) References Cited

U.S. PATENT DOCUMENTS

| | | | |
|---|---|---|---|
| 3,947,278 | * 3/1976 | Youtsey | 106/31.68 |
| 3,992,212 | * 11/1976 | Youtsey et al. | 106/1.14 |
| 5,116,411 | * 5/1992 | O'Neill et al. | 106/31.67 |
| 5,223,026 | * 6/1993 | Schwarz, Jr. | 106/31.43 |
| 5,224,992 | 7/1993 | McGinnis | 106/284.3 |
| 5,738,719 | * 4/1998 | Wallquist et al. | 106/498 |
| 5,849,073 | * 12/1998 | Sakamoto et al. | 106/437 |
| 5,951,750 | * 9/1999 | Zimmermann et al. | 106/417 |
| 6,019,829 | * 2/2000 | Omae et al. | 106/31.65 |

FOREIGN PATENT DOCUMENTS 48-091140 * 11/1973 (JP) .

OTHER PUBLICATIONS

Database WPI, Section Ch, Week 8534, Derwent Publications Ltd., London, GB; Class E12, AN 85–206217, XP002116864 & JP 60 130002 A (Matsushita Elec Ind Co Ltd), Jul. 11, 1985, *Zusammenfassung*.
Database WPI, Section Ch, Week 7423, Derwent Publications Ltd., London, GB; Class A82, AN 1974–42344V, XP002116865 & JP 48 091140 A (Toyo Ink Mfg Co), Nov. 27, 1973, *Zusammenfassung*.
W. Kurze in Ullmann, Lexikon der Chemie, vol. 8, p. 19 et seq. 5th edition (date unknown).
Derwent abstract of JP48/091140, Nov. 1973.*

* cited by examiner

Primary Examiner—Helene Klemanski
(74) Attorney, Agent, or Firm—Joseph C. Gil; Thomas W. Roy

(57) ABSTRACT

The present invention relates to compositions containing oxidatively drying binders and, as anti-skinning additives, tin(II) and tin(IV) compounds corresponding to formulas (I) and (II)

$$R^1\text{---COO---Sn---OOC---}R^2 \quad (I),$$

and $$(R^1\text{---COO})(R^2\text{---COO})_n\text{---Sn}(R^3)(R^4)_m \quad (II),$$

wherein
$R^1$, $R^2$, $R^3$ and $R^4$ are the same or different and represent linear or branched $C_1$–$C_{18}$ alkyl, $C_5$–$C_7$ cycloalkyl or phenyl,
n and m are the same or different and have a value of 0, 1 or 2 and n+m=2,
wherein the additives are present on the surface of the compositions as opposed to being mixed throughout the compositions.

9 Claims, No Drawings

TIN COMPOUNDS AS ANTISKINNING AGENTS FOR OXIDATIVELY DRYING BINDERS

BACKGROUND OF THE INVENTION

1. Field of the Invention

This present invention relates to the use of special tin salts of organic acids as additives to prevent skinning in air drying binders.

2. Description of the Prior Art

Oils and binders which undergo three-dimensional crosslinking by oxidation in the presence of oxygen (preferably from the air) at room temperature or at higher temperatures by the addition of driers (for example, metal soaps of transition metals; the solutions of driers in organic solvents or also water are known as "drier preparations") and, thus, are converted from the liquid phase into the solid phase may form a skin on their surface during storage in open or closed containers. This crosslinking which proceeds before the actual application of the lacquer is highly undesirable since it complicates handling of the lacquer because the skin must first be removed.

In extreme cases skinning may proceed to such an extent that none of the lacquer in the container may be used. Skinning also considerably reduces the storage stability of the lacquer or coating composition. This amounts to a marked degradation in the quality of the coating composition.

One example of skinning is caused by an accumulation of certain driers at the surface. Incorporation of the driers in the skin has a negative effect on the drying characteristics of the remainder of the lacquer.

Accordingly, it is necessary and also well known to add substances to the lacquer which inhibit the reaction with atmospheric oxygen at the (lacquer) liquid surface, i.e., in the container. These substances are known as antioxidants, antiskinning agents or additives. A list of known compounds may be found, for example, in H. Kittel, *Lehrbuch der Lacke und Beschichtungen,* Colomb Verlag, 1976 or also W. Kurze in *Ullmann, Lexikon der Chemie,* volume 8, pp. 19 et seq. (5$^{th}$ edition).

The most important classes of prior art compounds for the lacquer and printing inks industry are phenolic compounds and oximes. Phenolic antiskinning agents often considerably retard surface drying, such that they may be used alone only in special formulations. To the contrary oximes, such as methyl ethyl ketoxime, delay surface drying only slightly by virtue of their volatility. A disadvantage of this class of compounds resides in the toxicological properties thereof, which means that elaborate precautions are required during the application and formulation of these lacquers and coating compositions.

One particular application of methyl ethyl ketoxime involves spraying it onto high viscosity coating compositions in cans or similar containers. In this case the coating composition without an antioxidant is packaged in a container, sprayed with the antioxidant and then sealed under reduced pressure. This method is in particular used for printing inks. The advantage of this process is the small quantity of antioxidants required (based on the entire quantity of coating composition) and the extremely long possible storage life of such lacquers. However, it is necessary to spray the methyl ethyl ketoxime, which requires increased safety measures.

An object of the present invention is to provide antioxidants (antiskinning agents) which exhibit no negative effects on the drying behavior and properties, of the applied film of the corresponding coating compositions and in particular have no disadvantageous toxicological properties. It is an additional object of the present invention to provide antioxidants which may be applied only onto the surface of a coating composition which has already been formulated and packaged in a container for storage.

These object may be achieved with the antioxidants according to the invention which is described hereinafter.

SUMMARY OF THE INVENTION

The present invention relates to compositions containing oxidatively drying binders and, as anti-skinning additives, tin(II) and tin(IV) compounds corresponding to formulas (I) and (II)

$$R^1\text{—COO—Sn—OOC—}R^2 \quad\quad (I),$$

and

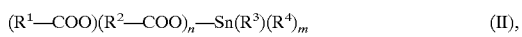

$$(R^1\text{—COO})(R^2\text{—COO})_n\text{—Sn}(R^3)(R^4)_m \quad\quad (II),$$

wherein

R$^1$, R$^2$, R$^3$ and R$^4$ are the same or different and represent linear or branched C$_1$–C$_{18}$ alkyl, C$_5$–C$_7$ cycloalkyl or phenyl, n and m are the same or different and have a value of 0, 1 or 2 and n+m=2, wherein the additives are present on the surface of the compositions as opposed to being mixed throughout the compositions.

DETAILED DESCRIPTION OF THE INVENTION

According to the invention, mixture of the compounds of formulas (I) and (II) may also be used. They preferably act as antioxidants. They may be used without solvent or in the form of solutions in organic solvents. Any known solvents may be used for this purpose, such as aromatics, fatty acid esters, mineral spirits, ketones and alcohols. Solutions in non-volatile, low viscosity liquids are preferred. C$_{14}$–C$_{22}$ fatty acid methyl esters are particularly preferred. Preferred solutions contain 5 to 15 wt. % of tin(II) and/or tin(IV) compounds. Tin dioctoates are preferred additives.

When the Sn(II) and Sn(IV) compounds are used according to the invention as antiskinning additives in oxidatively drying coating compositions, they are added to the coating composition in the container before it is applied.

Examples of suitable oxidatively drying binders that may be treated in accordance with the present invention include those which are well oxidatively drying printing inks based on e.g. alkyd resins or modified oils and related oxidatively drying coating compositions.

In accordance with the invention the compounds of formulas I and II, optionally in a solvent, are placed onto the surface of a packaged and opened composition. The quantity of the Sn(II) and Sn(IV) compounds added as antiskinning agents is determined by the surface area of the composition in the storage container (surface area of the opened storing container). A preferred quantity is about 0.01 and 0.04 g of Sn-compound per 24 cm$^2$ of surface area. Mostly preferred is a quantity of 0.02 g Sn-compound per 24 cm$^2$ of surface area.

This means that the tin compounds are used only in minimal quantities and the added tin content (based on the entire composition) is in the ppm range, which is below the admissible limit value for foodstuffs (in food cans) (*Römpp-Lexikon Lebensmittelchemie,* Thieme Verlag, Stuttgart, New York 1995, p. 952).

The advantage of the use of Sn(II) and Sn(IV) compounds as antiskinning agents is that, due to their very low vapor pressure at room temperature, they are considered to be non-volatile compounds. Thus, neither users nor the ambient atmosphere is subjected to any exposure during application of the compositions. This is an advantage over the oximes currently in use.

The invention is further illustrated but is not intended to be limited by the following examples in which all parts and percentages are by weight unless otherwise specified.

EXAMPLES

1: Embodiments:

The following compounds and blends were used in the examples:
a) tin di-(2-ethylhexanoate),
b) dibutyltin dilaurate,
c) tributyltin (2-ethylhexanoate),
d) tin oxalate,
f) 10 wt. % tin di-(2-ethylhexanoate), 90 wt. % soya oil methyl ester.

2: Use According to the Invention to Prevent Skinning

The preceding antiskinning agents a) to f) according to the invention were placed on an offset printing ink (red, from Hartmann), which had been formulated with 2 wt. % of a combination drier (Octa-Soligen Trockner 26 from Borchers GmbH), which contained 2 wt. % of Co metal (in Co(II) form) and 6 wt. % of Mn metal (in Mn(II) form).

In a first series of tests, several 5.0 g portions of the ink were placed in cylindrical metal containers having a diameter of 5.5 cm and a height of 1.0 cm. The quantities of antiskinning additives set forth in Table 1 were then applied by means of a spray can onto the ink. The time until skinning was observed was then measured on these batches.

TABLE 1

Skinning prevention tests on red offset printing ink (see above)

| Quantity added: | Time until skinning: |
|---|---|
| no additive | 3–4 days |
| 0.2 g of methyl ethyl ketoxime[1)] | 5–6 days |
| 0.01 g of additive a) | 9–10 days |
| 0.02 g of additive a) | >20 days |
| 0.1 g of additive f) | 9–10 days |
| 0.2 g of additive f) | >20 days |
| 0.3 g of additive f) | >20 days |

[1)]Borchinox M2 from Borchers GmbH

The drying characteristics of the printing ink were not influenced negatively.

In a second series of tests, 1.0 kg portions of the previously described ink were packaged in standard containers for printing inks (approximately cylindrical metal cans, when filled with 1 kg of ink, the lacquer had a surface area of 153 cm²). The quantities of antiskinning additives set forth in Table 2 were then applied by means of a spray can onto the batch. The time until skinning was observed was then measured on these batches.

TABLE 2

Skinning prevention tests on red offset printing ink (see above)

| Quantity added: | Time until skinning: |
|---|---|
| no additive | 3–4 days |
| 2.0 g of methyl ethyl ketoxime[1)] | 7–8 days |
| 2.6 g of methyl ethyl ketoxime[1)] | 13–14 days |
| 0.065 g of embodiment a) | 9–10 days |
| 0.13 g of embodiment a) | >20 days |
| 0.65 g of embodiment f) | 9–10 days |
| 1.3 g of embodiment f) | >20 days |
| 2.6 g of embodiment f) | >20 days |

[1)]Borchinox M2 from Borchers GmbH

The drying characteristics of the printing ink were not influenced negatively.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition containing an oxidatively drying binder and, as an anti-skinning additive, a tin(II) and/or tin(IV) compound corresponding to formulas (I) or (II)

and

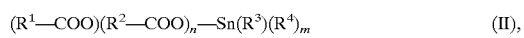

wherein
$R^1$, $R^2$, $R^3$ and $R^4$ are the same or different and represent linear or branched $C_1$–$C_{18}$ alkyl, $C_5$–$C_7$ cycloalkyl or phenyl, n and m are the same or different and have a value of 0, 1 or 2 and n+m=2, wherein the additive is present on the surface of the composition as opposed to being mixed throughout the composition and is not present in the form of a skin.

2. The composition of claim 1 wherein the additive is dissolved in an organic solvent.

3. The composition of claim 2 said organic solvent comprises a $C_{14}$–$C_{22}$ fatty acid methyl ester.

4. The composition of claim 1 wherein the composition is an oxidatively drying printing ink.

5. The composition of claim 2 wherein the composition is an oxidatively drying printing ink.

6. The composition of claim 3 wherein the composition is an oxidatively drying printing ink.

7. The composition of claim 1 wherein the composition is an oxidatively drying coating composition.

8. The composition of claim 2 wherein the composition is an oxidatively drying coating composition.

9. The composition of claim 3 wherein the composition is an oxidatively drying coating composition.

* * * * *